United States Patent [19]
Mitsui

[11] Patent Number: 6,066,362
[45] Date of Patent: May 23, 2000

[54] METHOD OF PROCESSING A FILAMENT YARN FOR A RUBBER HOSE

[75] Inventor: Kenichi Mitsui, Ichinomiya, Japan

[73] Assignee: Toyoda Gosei Co., Ltd., Aichi, Japan

[21] Appl. No.: 09/210,963

[22] Filed: Dec. 15, 1998

[30] Foreign Application Priority Data

Dec. 15, 1997 [JP] Japan .................................. 9-345291

[51] Int. Cl.$^7$ .................................................. D02G 3/00
[52] U.S. Cl. ........................ 427/175; 427/379; 427/381; 427/393.5; 427/434.6
[58] Field of Search ........................... 427/175, 379, 427/381, 393.5, 434.6

[56] References Cited

U.S. PATENT DOCUMENTS

| | | | |
|---|---|---|---|
| 4,326,905 | 4/1982 | Tanaka | 156/149 |
| 4,419,317 | 12/1983 | Fujiwara et al. | 264/184 |
| 4,944,821 | 7/1990 | Nishikawa et al. | 156/161 |

FOREIGN PATENT DOCUMENTS 63-63798   12/1988   Japan .

*Primary Examiner*—Shrive Beck
*Assistant Examiner*—Jennifer Calcagni
*Attorney, Agent, or Firm*—Pillsbury Madison & Sutro LLP

[57] ABSTRACT

A radiator hose is provided with an inner tube rubber and a cover rubber. The inner tube rubber is coiled on the outer circumference with filament yarns made of nylon 6,6 separating predetermined spaces each other. The filament yarns are twisted at predetermined twist number before coiling, and pass through an adhesive agent supplying step, a dry-heating step while applying tension to the filament yarns and reel-hank steps, and goes into a wet-heating step. For the wet-heating step, the filament yarns are given temperature equivalent to a vulcanizing temperature, applying no tension to the filament yarns. By the wet- and dry-heating, the filament yarns are prevented from biting into the inner tube rubber. Since the filament yarns are immersed into the solution of an adhesive agent before the dry-heating, the solution attached on the filament yarns is dried off rapidly by the dry-heating thereafter.

7 Claims, 3 Drawing Sheets

METHOD OF PROCESSING A FILAMENT YARN FOR A RUBBER HOSE

BACKGROUND OF THE INVENTION

1. Field of the Invention

The present invention relates to a method of processing filament yarns for rubber hoses made of polyamide to be coiled and buried in the rubber hoses to be treated with vulcanization.

2. Description of the Related Art

Conventionally known rubber hoses are reinforced with fibers (filament yarns) coiled around an inner tube with predetermined spaces. Namely, as shown in Fig.7, such a rubber hose 51 is in general produced by extrusion-molding an inner tube rubber 52, coiling filament yarns 53 therearound, extruding and supplying a cover rubber 54 therearound, and performing the vulcanization thereon. However, as shown in the same, the rubber hose 51 produced as mentioned above is that the filament earn 53 causes shrinkage due to the heat at the time of vulcanization, and bite into the inner tube rubber 52, whereby the inner tube rubber 52 reduces its thickness, otherwise the inner tube rubber 52 and the cover rubber 54 are probably caused with unevenness in the inner and outer surfaces thereof.

As a technology for solving such inconveniences, there is known an art disclosed in Japanese Patent Publication No. Sho. 63-63798. For producing rubber hoses, this art at first carries out the dry-heating treatment at an ordinary humidity under a condition of applying tension, and further prepares nylon filament yarns having been subjected to a wet-heating treatment under steam atmosphere under a condition of applying no tension thereto. The art then coils in spiral the thus treated nylon filament yarns on the outer circumference of the inner tube rubber, leaving spaces between the yarns, covers a cover rubber cover the outer circumference, and performs the vulcanization. Thus, by drying the nylon filament yarns under the condition of applying the tension thereto, and thereafter wet-heating it under the condition of applying no tension thereto, it is possible to provide such nylon filament yarns without largely lowering elastic coefficient and causing any shrinkage in relation with the heat at the vulcanization.

The nylon filament yarn coiled and buried in the rubber hose should firmly adheres to the rubber after the vulcanization. But said publication does not so much refer to a treatment for securing an adhesive property.

It is, thereupon, considered to coat a solution of an adhesive agent to the inner tube rubber at a step after the wet-heating treatment of the nylon filament yarn and before coiling it over the inner tube rubber, and operate the coiling after the drying step. Herein, as the solution of the adhesive agent, a RFL (resorcinol, formalin and rubber latex) solution is in general used. Due to the existence of RFL, the mutual adhesion between the nylon filament yarn and the rubber may be attained.

However, if the adhesion manner as above said is employed, a drying step after coating must be independently provided, resulting to invite increment of the number of treating steps and cost. Ii addition, if performing concurrently and continuously the extrusion of the inner tube rubber, the coiling of the nylon filament yarns and the extrusion of the cover rubber, the adhesive agent as said above is difficult to coat, subsequently to invite lowering of workability.

SUMMARY OF THE INVENTION

In view of the above mentioned circumstances, it is an object of the invention to offer a method of processing filament yarns for rubber hoses where the filament yarns can be prevented from biting into the inner tube rubber due to the shrinkage thereof, and it is possible to reduce the number of the treating steps and lower costs for manufacturing rubber hoses.

For accomplishing the above mentioned object, according to the present invention, there is provided a method of processing a filament yarn for a rubber hose, being made of polyamide to be coiled and buried in the rubber hose to be vulcanized. The filament yarn after having been spun and drawn is immersed in a solution of an adhesive agent. And filament yarn after the immersing step is dry-heated while applying a predetermined tension thereto. Further, the filament yarn is wet-heated after the dry-heating step while applying no tension thereto at a temperature between not less than a temperature added to the filament yarn at a vulcanization of the rubber hose and less than 170° C.

It is preferable that the polyamide is nylon 6 or nylon 6,6.

It is preferable that the filament yarn is twisted at twist number of not less than 120 t/m at least prior to the immersing step. Hereupon, the unit of the twist number "t/m" means the twist number per 1 meter length of the yarn.

Further, the filament yarn can be roughly coiled while leaving predetermined spaces.

Further, it is preferable that the temperature and a time of the wet-heating step are substantially same as those of the vulcanization of rubber hose.

Preferably, the solution of the adhesive agent mainly comprises a mixture of resorcinol, formalin and rubber latex.

Still further, the dry-heating step is preferably carried out at a temperature between not less than 240° C. and not more than 260° C.

According to the present invention, the filament yarns composed of polyamide after having been spun and drawn are immersed in the solution of the adhesive agent, and the immersed filament yarns are subjected to the dry-heating treatment under the condition of applying the tension thereto. Then, the drying of the adhesive agent solution attached to the surface of the filament yarns is accelerated, and at the same time, an orientation crystallization is accelerated, so that the filament yarns where the elastic coefficient is prevented from lowering are obtained.

Further, the wet-heating treatment is carried out to the filament yarns at temperatures between not less than temperatures transferred to the filament yarns at the time of vulcanizing treatment to be performed later to the hoses and less than 170° C. Then, a heat history as above mentioned is given to the filament yarns, whereby the filament yarns where the heat shrinkage is checked are obtained.

The thus treated filament yarns are coiled and buried in the rubber hose, and subjected to the vulcanizing treatment. Even if the heat is, therefore, transferred to the filament yarns when the vulcanization is carried out, the elastic coefficient is not lowered, and the shrinkage is difficult to occur.

Together with the above mentioned, the filament yarns and the rubber are firmly adhered by means of the adhesive agent previously given prior to the dry-heating treatment, though there is not provided independently the step of supplying and drying the adhesive agent.

Further, the above mentioned polyamide may be nylon 6 or nylon 6,6. Accordingly, the strength of the rubber hose may be reinforced with a comparatively low cost material.

Further, the filament yarns is preferably twisted at twist number of not more than 120 t/m at at least the step prior to said immersing step. The filament yarns are, therefore, less to bite into the inner tube when the rubber hose is bent. It is more desirable that the twisting is operated at the twist number of not more than 90 t/m.

Further, the filament yarns can be roughly coiled. Herein, if the filament yarn is roughly coiled leaving spaces, it more easily bites into the inner tube than a case of closely coiled yarn, bit the above workings can be securely performed in spite of the rough coiling.

Still further, the temperatures and times of the wet drying treatment can be substantially the same as those of vulcanizing treatment, so that it is prevented that an unnecessary heat history is given to the filament yarns, and the heat shrinkage at the time of vulcanization thereafter is checked more securely.

Still further, the solution of the adhesive agent is preferably main of the mixed solution of resorcinol, formalin and rubber latex. Thus, the resin element of resorcinolformalin is firmly combined with the filament yarn, and the element of rubber latex is firmly combined with the rubber.

In addition, the dry-heating treatment can be carried out at the temperatures of not less than 240° C. to not more than 260° C. Therefore, the drying of the adhesive agent solution is accelerated, and the orientation crystallization is securely progressed, and the lowering of the elastic coefficient is certainly controlled. At the time of the vulcanization, the filament yarn is prevented from deterioration by the vulcanizing treatment at exceedingly high temperature.

DETAILED DESCRIPTION OF THE PREFERRED EMBODIMENTS

Figure 2:
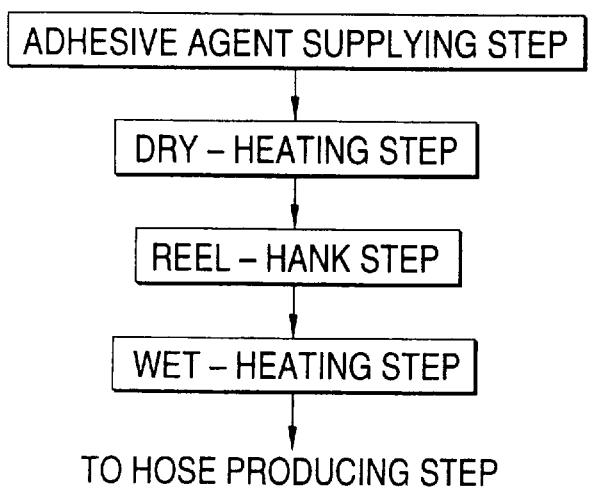
FIG. 2 shows a processing showing the treating steps of the filament yarn.
Figure 3:
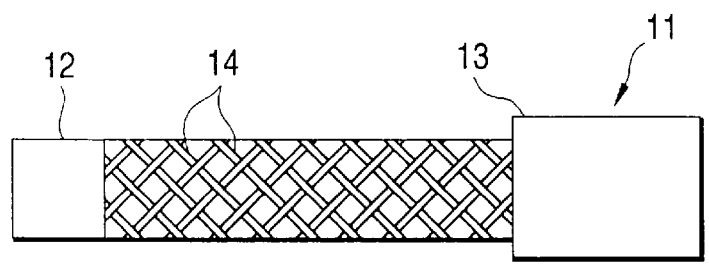
FIG. 3 is a side view, partially in section, showing the structure of the rubber hose.
Figure 4:
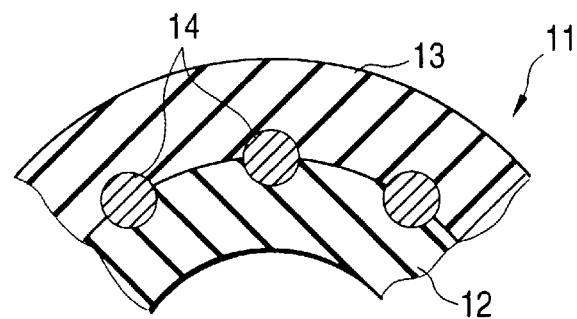
FIG. 4 is a partial cross sectional view showing the structure of the rubber hose.

Reference will be made to one embodiment of exemplifying the present invention following FIGS. 1 to 6. As shown in FIGS. 3 and 4, a radiator hose 11 as a reinforced rubber hose for low pressure is provided with a cylindrical inner tube rubber 12 and a cover rubber 13 covering it. On the outer circumference of the inner tube rubber 12, the filament yarns 14 made of nylon 6,6 are coiled each other with predetermined spaces.

Figure 5:
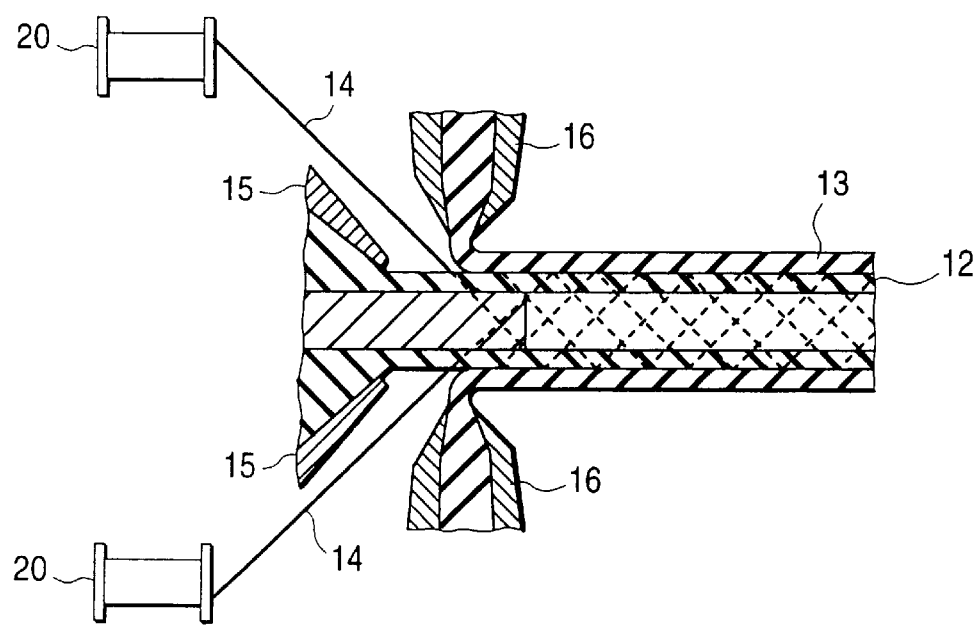
FIG. 5 is a partial cross sectional view schematically showing the producing step of the rubber hose.

As seen in FIG. 5, the radiator hose 11 in the instant embodiment is made available by extrusion-molding the inner tube rubber 12 out of a first die 15, and coiling the filament yarns 14 reeled in bobbins 20 over the inner tube rubber 12, extruding and feeding the cover rubber 13 out of a second die 16 around the coiled filament yarns, and thereafter carrying out the vulcanization. Each of extruding, coiling and further extruding is performed continuously and almost simultaneously.

In the present embodiment, the treating manner prior to coiling of the filament yarns 14 is characterized, and will be explained. As shown in FIG. 2, the filament yarn 14 enters a predetermined twisting (twist number: 90 t/m) via the spinning and drawing steps, and passes through the adhesive agent supplying step (immersing), the dry-heating step and the reel-hank step, and goes to the wet-heating step.

Figure 1:
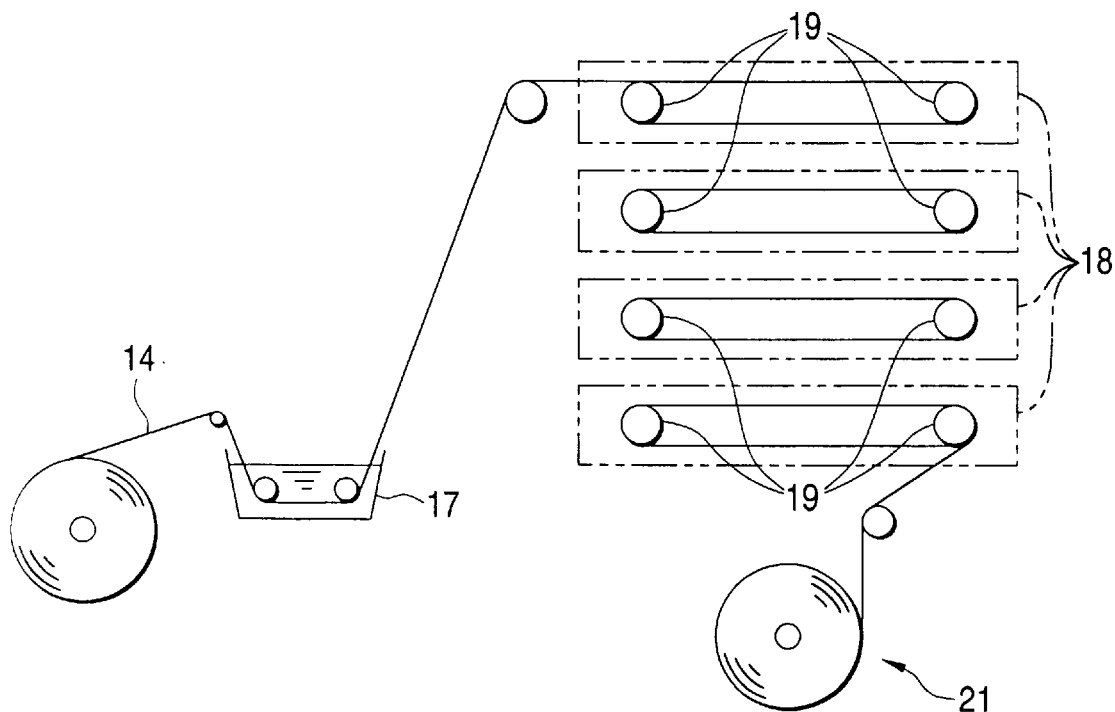
FIG. 1 is a schematic view showing respective apparatuses of the adhesive agent supplying step, the dry-heating step and the reeling step in one embodiment.

FIG.1 schematically shows each of apparatuses in the adhesive agent supplying step, the dry-heating step and the coiling step. As seen in the same, a dip vessel 17 holds the RFL (resorcincol, formalin, rubber latex) solution in the adhesive agent supplying step, and the spun and drawn filament yarn 14 is immersed temporarily.

For the dry-heating, multi heaters 18 and rollers 19 are employed. The temperature in the heater 18 is set at 240° C. (treating time: 80 sec), and the humidity is set at the same level as an open air. The rotation speed of each roller 19 is set such that a predetermined tension is given to the filament yarn 14 and is loosened. Repetition of applying and loosing of the tension is not essential, however, physical property of the yarn can be? stabilized by the repetition of applying and loosing of the tension. The total time of applying the tension is the actual time of the dry-heating treatment. In this embodiment, total time of applying the tension occupies 70% of the treating time. The filament yarn 14 guided out from the final heater 13 is reeled by a winding machine 21.

For the wet-heating, the filament yarn 14 reeled by the winding machine 21 is subjected to a hank at predetermined length, and fed into a not shown wet-heating apparatus, giving no tension. Herein, the interior of the wet-heating apparatus is of a steam atmosphere, and the temperature is set at 150° C. (treating time: 30 min), being the same as a temperature of the later mentioned vulcanizing treatment. The filament yarns 14 having passed the wet-heating treatment are taken up on the bobbins 20 (see FIG. 5), and sent to said coiling step.

A further reference will be made to the working and effect of the instant embodiment.

Following the instant embodiment, the spun and drawn filament yarn 14 is immersed in the RFL solution, and subjected to the dry-heating treatment, while giving the tension thereto. Then, the orientation crystallization is progressed, thereby enabling to obtain the filament yarn 14 where the lowering of the elastic coefficient is checked.

Further, the filament yarn 14 is subjected to the wet-heating treatment at the same temperature as the vulcanizing temperature under the condition of giving no tension. At this time, by giving the heat history to the filament yarn 14, it is possible to produce the filament yarn 14 where the heat shrinkage thereafter is checked.

Also even when the vulcanization is undertaken thereafter, the shrinkage is less to occur without lowering of the elastic coefficient of the filament yarn 14. As a result, the biting effected by the shrinkage of the filament yarn 14 into the inner tube can be prevented, and the appearance and quality can be avoided from deterioration. In particular, when the filament yarn 14 is roughly coiled with the predetermined spaces, the biting more easily occurs than the case of the close coiling, but in spite of the rough coiling, the above mentioned working effect can be securely exhibited.

In this embodiment, the filament yarn 14 is immersed into the RFL solution before the dry-heating treatment, whereby it is possible to simultaneously progress the drying of the RFL solution attached on the surface of the filament yarn 14 by the heat of the dry-heating treatment. Thus, for coiling and burying the filament yarn 14, it can be firmly combined with the inner tube ribber 12 and the cover rubber 13 by the previously given adhesive agent before the drying, though there is not provided independently a step of supplying and drying the adhesive agent. Consequently, it is possible to reduce the number of the steps for producing the radiator hose 11 and the cost, and heighten the workability.

In this embodiment, the nylon 6,6 is employed as a reinforcing fabric material, so that the reinforcement of high degree of the radiator hose 11 can be accomplished with the comparatively cheap material.

In addition, following this embodiment, the filament yarns 14 are twisted at the twist number of 90 t/m in the prior step of the adhesive agent. So, when the radiator hose 11 is bent, the filament yarn 14 is difficult to bite into the inner tube rubber 12, resulting in more securing the above mentioned effect.

In the Embodiment, the RFL solution is used as the solution of the adhesive agent. The resin element of resorcinol-formalin is solidly combined with the filament yarn 14, and the element of the rubber latex is combined with the inner tube rubber 12 and the cover rubber 13.

The invention is not limited to the above mentioned embodiment, but can be reduced to practice as follows by appropriately changing parts of the structure so far as not getting out of the subject matter of the invention.

Figure 6:
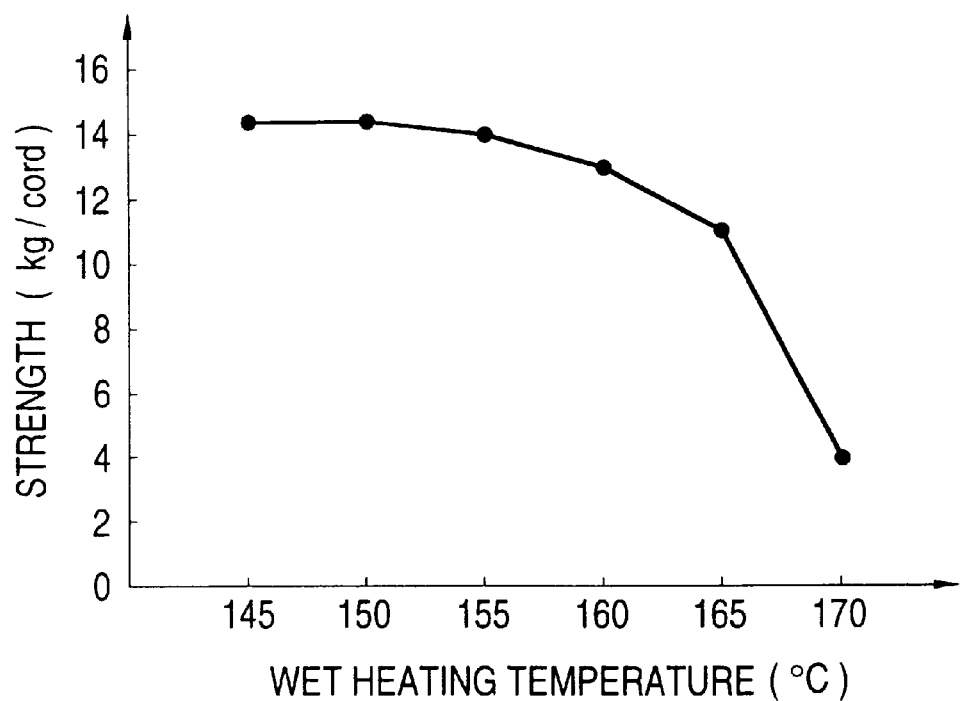
FIG. 6 is a graph showing the relationship of strength vs. wet-heating temperature.
Figure 7:
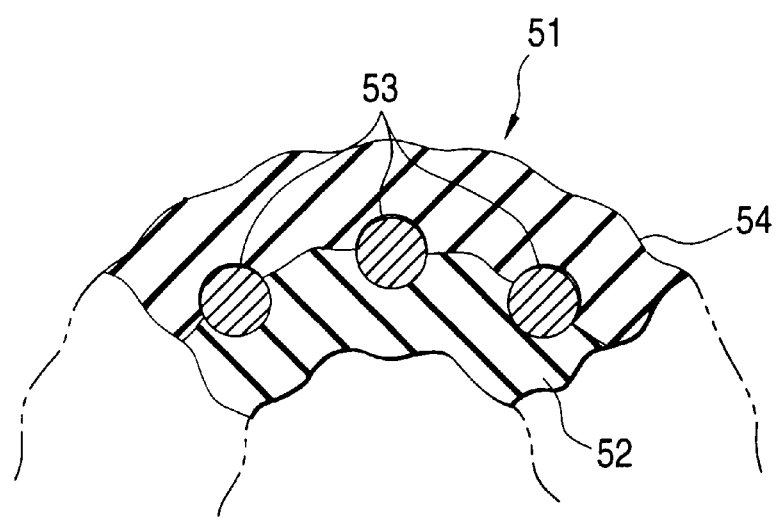
FIG. 7 is a partial cross sectional view of the structure of the conventional art rubber hose.

(1) In the above embodiment, the wet drying temperature is 150° C., but not limited to this temperature if it is equivalent to or not less than temperatures transferred to the filament yarn at the time of the vulcanization. In general, the temperature added to the filament yarn is somewhat lower than the vulcanizing temperature, and so a satisfactory result can be expected even if the wet-heating temperature is lower by around 5° C. That is, the vulcanizing temperature shows an atmosphere temperature in a steam pot and a temperature of the yarn located at the inner side of the hose is somewhat lower than the atmosphere temperature in the steam pot. Therefore, satisfactory result can be expected even if the wet-heating temperature is lower by around 5° C. Further, it becomes possible to prevent the deterioration of the strength of the yarn by the useless heat history. However, it should be noted that the wet-heating temperature should be less than 170° C., because if not less than 170° C., the strength of the filament yarn 14 is, as seen in FIG. 6, markedly lowered by inter- and intra- molecule dissolution. In FIG. 6, "cord" means 840d/2 yarn produced by twisting two 840-denier yarns.

If the treating time is enough to prevent the shrinkage of the filament yarn 14, the embodiment is no limited to the above mentioned numerical values.

(2) In th(e above embodiment, the temperature in the heater 18 for the dry-heating treatment is set to be 240° C., but if it is enough for so-called heat setting, it is not limited to the above temperatures.

If the treating time is enough for drying the RFL solution and heat setting, it is not limited to the above mentioned numerical values.

(3) In the above embodiment, the RFL solution is used for the solution of the adhesive agent, but a solution of any other adhesive agent will do if it can attain the adhesion of the filament yarn 14 and the rubber.

(4) In the above embodiment, the filament yarn 14 made of nylon 6,6 is shown, but other polyamide (for example, nylon 6, nylon 12 or aromatic polyamide) may be used for the reinforcing filament.

(5) In the above embodiment, the filament yarn 14 is coiled at the predetermined spaces, it may be closely, that is, adjacently coiled.

(6) In the above embodiment, the filament yarn 14 is given the predetermined twisting (twist number: 90 t/m) prior to applying the adhesive agent, but the twisting is not limited to this twist number.

But it is desirable that the twist number is not more than 120 t/m, more desirably not more than 90 t/m, still more desirably not more than 60 t/m).

As mentioned above, depending upon the method of processing the filament yarn for the rubber hose of the present invention, it is possible to prevent the biting of the filament yarn into the inner tube rubber effected by the shrinkage of the filament yarn at the time of the vulcanization, reduce the step number for producing rubber hoses and the costs, and improve the workability.

What is claimed is:

1. A method of processing a polyamide filament yarn to be coiled and buried in a rubber hose to be vulcanized, comprising the steps of:

spinning and drawing the filament yarn;

immersing the spun and drawn filament yarn in a solution of an adhesive agent;

dry-heating the filament yarn after the immersing step while applying a predetermined tension thereto; and wet-heating the filament yarn after the dry-heating step while applying no tension thereto at a temperature between a temperature added to the filament yarn at a vulcanization of the rubber hose and 170° C.

2. A method of processing a filament yarn for a rubber hose according to claim 1, wherein said polyamide is nylon 6 or nylon 6,6.

3. A method of processing a filament yarn for a rubber hose according claim 1, further comprising the step of twisting the filament yarn at twist number of not less than 120 t/m at least prior to the immersing step.

4. A method of processing a filament yarn for a rubber hose according to claim 1, wherein the filament yarn are roughly coiled while leaving predetermined spaces.

5. A method of processing a filament yarn for a rubber hose according to claim 1, wherein the temperature and a time of the wet-heating step are substantially same as those of the vulcanization of rubber hose.

6. A method of processing a filament yarn for a rubber hose according to claim 1, wherein the solution of the adhesive agent mainly comprises a mixture of resorcinol, formalin and rubber latex.

7. A method of processing a filament yarn for a rubber hose according to claim 1, wherein the dry-heating step is carried out at a temperature between 240° C. and 260° C.

* * * * *